United States Patent Office 3,427,285
Patented Feb. 11, 1969

3,427,285
PROCESS FOR THE PREPARATION OF
POLYEPISULPHIDES
Stephen Adamek, Islington, Ontario, and Bertie B. J.
Wood, Oakville, Ontario, Canada, assignors to The Dunlop Company Limited
No Drawing. Filed May 9, 1966, Ser. No. 548,425
Claims priority, application Great Britain, May 6, 1966,
20,151/66
U.S. Cl. 260—67        13 Claims
Int. Cl. C08g 33/62, 33/08

ABSTRACT OF THE DISCLOSURE

Preparation of a poly(episulphide) by reacting a poly-(episulphide) having one terminal thiol or hydroxyl group and another terminal hydroxyl or amino group in the molecule with a reagent selected from the class consisting of monoepisulphides, saturated aliphatic and cycloaliphatic aldehydes, hydrochloric acid, sulfuric acid, nitrous acid and nickel powder.

This invention relates to a process for the preparation of polyepisulphides and to polyepisulphides when prepared by the process. The invention relates particularly to a process for the preparation of polyepisulphides by modifying at least one of the end groups of a polyepisulphide having reactive terminal groups.

According to the present invention, a process for the preparation of a polyepisulphide comprises contacting a polyepisulphide having at least one terminal —SH or —OH group in the molecule with a reagent (as hereinafter defined) and allowing the polyepisulphide to react with said reagent.

According to the present invention also, there is provided a polyepisulphide when prepared by the process according to the immediately-preceding paragraph.

The reagent, with which the polyepisulphide having at least one terminal —SH or —OH group is contacted is a mono-epoxide, a monoepisulphide, an aldehyde, an imine, a strong acid, a mild oxidizing agent or nickel powder. An example of a suitable monoepisulphide is propylene episulphide. The epoxides which can be used include aliphatic and aromatic monoepoxides such as ethylene oxide, propylene oxide, epichlorhydrin and styrene oxide. An example of an imine which can be used is ethylene imine, and examples of aldehydes which can be used are the aliphatic and cycloaliphatic aldehydes such as formaldehyde, acetaldehyde, furfural, dioxane and trioxane. Mild oxidizing agents such as lead dioxide and iodine may be used, as may strong acids such as hydrochloric acid and sulphuric acid.

The amount of the reagent with which the polyepisulphide having at least one terminal —SH or —OH group is contacted is usually such that the molar ratio of said reagent to the polyepisulphide is from 1:1 to 10:1, preferably from 1:1 to 5:1. However, a large excess of the reagent may be used, if desired, but when the reagent is a strong acid it is preferred to avoid a high concentration of the acid, since strong acids tend to cause depolymerization of the polymer. The amount of the reagent used depends upon the terminal group to be modified and upon the reagent used to effect the modification, and a larger amount of a particular reagent may be required to modify, say, a thiol group than modify, say, an amino group. The amount of the reagent will also depend upon the number of terminal groups to be modified, and the amounts given hereinbefore are based upon the modification of a single terminal group of the polyepisulphide.

The reaction between the polyepisulphide having at least one terminal —SH or —OH group and said reagent can be carried out in the absence of a reaction medium or in the presence of an inert liquid reaction medium. Usually a reaction medium is used and suitable reaction media are organic solvents for the polyepisulphide such as hydrocarbons, e.g., benzene, and media in which the polyepisulphide is insoluble such as dimethyl sulphoxide or water. Preferably, the reaction medium is a polar compound such as tetrahydrofurane if a solvent is required, or water if a non-solvent is required. The amount of the reaction medium is not critical and a large excess may be used, if desired. Usually, the amount will be from 0.5 ml. to 5 ml., and preferably from 2 ml. to 4 ml. of the reaction medium per gramme of the polyepisulphide.

The reaction mixture is preferably agitated throughout the reaction, and when the reaction medium is a non-solvent for the polyepisulphide, agitation of the mixture may be necessary. Any form of agitation may be used, for example low speed or high speed stirring, shaking or tumbling.

The temperature at which the reaction is carried out is not critical and temperatures of from 0° C. to 100° C. may be used. Preferably, the temperature is from 30° to 80° C.

The polyepisulphide which is contacted with the reagent is a polymer of one or more episulphides and has at least one reactive terminal group. The reactive terminal group or at least one such group is a hydroxy or a thiol group. The other group or groups if present, may be, for instance, amino-groups or hydroxyl groups depending upon the catalyst and cocatalyst used to prepare the polyepisulphide. The polyepisulphide can be prepared by polymerizing one or more episulphides using a catalyst being a compound of a metal of Group IIB of the Mendeleeff Periodic Table in the presence of a cocatalyst. A process for the preparation of a polymer comprises polymerizing one or more episulphides in the presence of a polymerization catalyst being a compound of a metal of the B-sub Group II of the Mendeleeff Periodic Table, and a cocatalyst being ammonia, an inorganic ammonium compound, an organic amine, hydrazine, or a derivative of hydrazine. The resulting polymer has reactive terminal groups at least one of which is a thiol group. The other group may be a hydroxyl group, but will usually be an amino-group.

The polyepisulphide having at least one —SH or —OH terminal group, can if desired, have a molecular weight of greater than 10,000 but it is preferred to use a polyepisulphide having a molecular weight of less than 10,000. Particularly useful polyepisulphides are those which have a molecular weight of from 750 to 3,500.

The polyepisulphides of the present invention have at least one reactive terminal group, the particular group or groups depending upon the reagent with which the initial polyepisulphide having at least one reactive terminal —SH or —OH is contacted. For instance, if a polyepisulphide having one terminal amino-group and one terminal thiol group is reacted with an imine, the product will be a polyepisulphide having two terminal amino-groups. If the polyepisulphide is contacted with an aldehyde the polyepisulphide produced will have terminal hydroxyl groups, and also the molecular weight of the polyepisulphide will probably be higher than the starting polyepisulphide due to combination of polymer chains during the reaction. Mild oxidizing agents cause oxidation of thiol groups to give disulphide linkages between polymer chains; strong acids cause combination of polymer chains; and nitrous acid causes the formation of hydroxyl groups. When nickel powder is used as the reagent dimerization of the polymer occurs with the liberation of ammonia and the formation of a dithiol.

The invention is illustrated by the following examples:

EXAMPLE I

This example illustrates the preparation of poly (propylene-episulphide) having terminal hydroxyl groups from poly(propylene-episulphide) having a terminal amino-group and a terminal thiol group.

10 gm. of poly(propylene-episulphide) having an average molecular weight of 1150 (measured by vapour-phase osmometry), prepared by polymerizing 600 gm. of propylene episulphide using as catalyst 1 gm. of cadmium carbonate in the presence of 50 ml. of 30 percent aqueous ammonium hydroxide solution to give a polymer having one amino-terminal group and one thiol-terminal group, were dissolved in 20 ml. of dry tetrahydrofurane. 0.2 ml. of ethylene oxide were added to the solution which was then heated at 70° C. for 24 hours after which time any volatile components were removed under vacuum. The molecular weight of the polymer so obtained was determined by osmometry and the terminal groups were identified. The results are shown in Table I below.

The above procedure was repeated six times (Experiments 2 to 7) but using the ethylene oxide in the amounts shown in Table I below.

The procedure was again repeated twice (Experiments 8 and 9) but using propylene oxide in the amount shown in Table I instead of the ethylene oxide.

For purposes of comparison, the procedure was again repeated (Control) but in this case the ethylene oxide or other reagent was excluded.

In Table I, EtOx represents ethylene oxide, PrOx represents propylene oxide, ratio represents the molar ratio of reagent to polymer, and $M_n$ is the number average molecular weight of the resulting polymer.

TABLE I

| Expt. No. | Reagent (mls.) EtOx | Ratio | Yield polymer (Gms.) | $M_n$ |
|---|---|---|---|---|
| 1 | 0.2 | 0.5 | 10.1 | 1,190 |
| 2 | 0.4 | 1.0 | 10.4 | 1,200 |
| 3 | 0.8 | 2.0 | 9.9 | 1,660 |
| 4 | 1.2 | 3.0 | 10.4 | 1,340 |
| 5 | 2.0 | 5.0 | 10.5 | 1,620 |
| 6 | 4.1 | 10.0 | 10.8 | 1,480 |
| 7 | 8.2 | 20.0 | 10.4 | 1,440 |
|  | PrOx |  |  |  |
| 8 | 2.7 | 4.0 | 11.2 | 1,520 |
| 9 | 4.5 | 6.0 | 12.3 | 1,440 |
| Control |  |  | 10.3 | 1,150 |

Experiment Nos. 3, 5 and 8 were then repeated using water as the reaction medium instead of tetrahydrofurane. This change had a negligible effect.

The end groups of each polymer were identified and are shown in Table IA below, in which (SH), (NH₂), and (OH) represent the average number of —SH, —NH₂ and —OH groups, respectively, in the polymer, and the ratio (COC)/(CH₂) represents the ratio of the number of ether groups to the number of methylene groups in the polymer chain.

TABLE IA

| Expt. No. | (SH) | (NH₂) | (OH) | (COC)/(CH₂) |
|---|---|---|---|---|
| 1 | 1.0 | (*) | (—) | (—) |
| 2 | 0.8 | (*) | (—) | (—) |
| 3 | 0.9 | (*) | (*) | (—) |
| 4 | 0.9 | (*) | (*) | 0.1 |
| 5 | 0.1 | Trace | (*) | 0.1 |
| 6 | (—) | (—) | (*) | 0.4 |
| 7 | (—) | (—) | (*) | 0.4 |
| 8 | (—) | (—) | (*) | (—) |
| 9 | (—) | (—) | (*) | (—) |
| Control | 1.0 | 1.0 | (—) | (—) |

(—) The particular group was not identified in the polymer.
(*) The particular group was shown to be present but its concentration was not determined.

EXAMPLE II

This example illustrates the use of aldehydes as modifying agents.

10 gm. of poly(propylene-episulphide) having a molecular weight of 1150 prepared as outlined in Example I and having one amino-terminal group and one thiol terminal group, were dissolved in 10 ml. of tetrahydrofurane, 0.42 ml. of a 30 percent aqueous solution of formaldehyde was added and the mixture was heated at 70° C. for 24 hours. The volatile components of the mixture were then removed.

The above procedure was repeated four times (Experiments 2 to 5) using the amounts of the formaldehyde solution shown in Table II below, in which the results are also given.

The procedure was again repeated four times (Experiments 6 to 9) except that the formaldehyde was replaced by the aldehyde shown in Table II.

For purposes of comparison, the procedure was again repeated (Control) but in this case the aldehyde was excluded.

In Tables II and IIA the symbols used are the same as the symbols used in Tables I and IA of Example I.

TABLE II

| Expt. No. | Aqueous soln. of reagent (mls.) | Ratio | Yield (gms.) | $M_n$ |
|---|---|---|---|---|
|  | Formaldehyde |  |  |  |
| 1 | 0.42 | 0.5 | 9.8 | 1,760 |
| 2 | 0.85 | 1.0 | 9.8 | 2,320 |
| 3 | 1.70 | 2.0 | 10.4 | 2,130 |
| 4 | 2.55 | 3.0 | 10.5 | 1,980 |
| 5 | 8.5 | 10.0 | 11.7 | 1,650 |
|  | Acetaldehyde |  |  |  |
| 6 | 2.5 | 5.0 | 11.4 | 2,720 |
| 7 | 0.25 | 1.0 | 9.8 | 1,900 |
| 8 | 0.75 | 3.0 | 10.5 | 2,070 |
|  | Furfural |  |  |  |
| 9 | 1.5 | 2.0 | 10.4 | 2,050 |
| Control | (—) | (—) | 10.3 | 1,150 |

(—) The particular group was not identified in the polymer.

TABLE IIA

| Expt. No. | (SH) | (NH₂) | (OH) |
|---|---|---|---|
| 1 | 0.4 | (*) | (*) |
| 2 | 0.5 | (*) | (*) |
| 3 | 0.1 | (*) | (*) |
| 4 | Trace | Trace | (*) |
| 5 | (—) | Trace | (*) |
| 6 | (—) | (—) | (*) |
| 7 | 0.6 | (*) | (*) |
| 8 | Trace | Trace | (*) |
| 9 | Trace | Trace | (*) |
| Control | 1.0 | (*) | (—) |

(—) The particular group was not identified in the polymer.
(*) The particular group was shown to be present but its concentration was not determined.

All the polymers except that from Experiment No. 1 were solids.

EXAMPLE III 10 gm. of poly(propylene-episulphide) were reacted with ethylene imine by the procedure outlined in Example I, except that the reaction was carried out at 70° C. for 16 hours instead of 24 hours. Six experiments were carried out, using the amounts of ethylene imine shown in Table III below. The end groups are shown in Table IIIA. For purposes of comparison, a control experiment was carried out.

In Tables III and IIIA the symbols used are the same as in Tables I and IA of Example I.

TABLE III

| Expt. No. | Reagent (mls.), ethylene imine | Ratio | Yield (gms.) | $M_n$ |
|---|---|---|---|---|
| 1 | 0.2 | 0.5 | 10.2 | 1,240 |
| 2 | 0.4 | 1 | 10.4 | 1,240 |
| 3 | 0.8 | 2 | 10.1 | 1,310 |
| 4 | 1.2 | 3 | 10.6 | 1,280 |
| 5 | 2.0 | 5 | 10.4 | 1,350 |
| 6 | 2.0 | 10 | 10.2 | 1,220 |
| Control | (—) | (—) | 10.3 | 1,150 |

(—) The particular group was not identified in the polymer.

TABLE IIIA

| Expt. No. | (SH) | (NH₂) |
|---|---|---|
| 1 | 0.9 | (*) |
| 2 | 0.7 | (*) |
| 3 | 0.6 | (*) |
| 4 | 0.1 | (*) |
| 5 | (—) | (*) |
| 6 | (—) | (*) |
| Control | 1.0 | (*) |

(—) The particular group was not identified in the polymer.
(*) The particular group was shown to be present but its concentration was not determined.

EXAMPLE IV 10 gm. of poly(propylene-episulphide) having a molecular weight of 1150 were reacted by the procedure described in Example I with the reagents shown in Table IV below in which the amount of each reagent is also shown. The reaction time was 16 hours at 70° C. instead of 24 hours. The results are shown in Table IV in which the symbols used are the same as in Tables I and IA of Example I.

TABLE IV

| Expt. No. | Reagent (gms.) | Yield (gms.) | Mn | (SH) | (NH₂) |
|---|---|---|---|---|---|
|  | PbO₂ |  |  |  |  |
| 1 | 0.5 | 9.9 | 2,640 | (—) | (*) |
|  | Iodine |  |  |  |  |
| 2 | 0.1 | 9.4 | 2,210 | 0.5 | (*) |
| 3 | 0.3 | 10.0 | 2,840 | (—) | (*) |
|  | Nickel powder |  |  |  |  |
| 4 | 0.5 | 10.1 | 2,350 | 1.8 | Trace |

(—) The particular group was not identified in the polymer.
(*) The particular group was shown to be present but its concentration was not determined.

These results show that dimerization of the polymer occurred, either by oxidation of the thiol terminal groups or by attack at the amino-terminal groups to yield a polymer of increased molecular weight.

EXAMPLE V

This example illustrates the use of a strong acid as the reagent. The acid was used in low concentrations.

10 gm. of poly(propylene-episulphide) having a molecular weight of 1150 were reacted with hydrochloric acid by the procedure outlined in Example I, but using a reaction time of 16 hours instead of 24 hours. The strength of the acid and the amounts used are given in Table V below. A control was also performed. In Table V the symbols used are the same as in Tables I and IA of Example I.

TABLE V

| Expt. No. | Reagent, 36N HCl | Mn | (SH) | No. of N atoms |
|---|---|---|---|---|
| 1 | 0.1 gm | 1,450 | 1.1 | 1.0 |
| 2 | 0.5 gm | 2,090 | 1.4 | 0.9 |
| 3 | 10.0 gm | 4,900 | 8.2 | 0.9 |
| 4 | Excess HCl gas | 3,400 | (—) | 1.1 |
| 5 | 0.5 gm. nickel powder | 2,350 | 1.8 | 1.0 |
| Control | (—) | 1,150 | 1.0 | 1.0 |

(—) The particular group was not identified in the polymer.

These results show that hydrochloric acid causes combination of the polymer chains.

The procedure was repeated but instead of hydrochloric acid, nitrous acid formed in situ from hydrochloric acid and sodium nitrite was used.

The results are shown in Table VA.

TABLE VA

| Expt. No. | Reagent (gms.), 36N HCl (mls.) plus NaNO₂ (gms.) | Mn | (SH) | (OH) | No. of N atoms |
|---|---|---|---|---|---|
| 6 | 6.0 plus 3.5 | 3,750 | (—) | (*) | 1.5 |
| 7 | 0.5 plus 0.3 | 2,540 | 0.8 | (—) | 1.2 |

(—) The particular group was not identified in the polymer.
(*) The particular group was shown to be present but its concentration was not determined.

These results show that two or more molecular chains have been combined with elimination of ammonia.

EXAMPLE VI 10 gm. of poly(propylene-episulphide) were added to 50 ml. of water, and the mixture was agitated for 24 hours at room temperature, by tumbling end over end. The polymer was then removed by filtering, and dried, and the end groups of the polymer were determined by infra-red spectroscopy.

This procedure was then repeated (Experiment No. 2), but 3 ml. of ethylene oxide were added to the mixture prior to agitation thereof. This latter procedure was then repeated twice (Experiments Nos. 3 and 4), except that instead of 3 ml. of ethylene oxide there was employed 10 ml. of ethylene oxide and 15 ml. of allyl glycidyl ether respectively. Also, in Experiment No. 3, the amount of poly(propylene-episulphide) was increased to 25 gm.

In Table VI, EtOx represents ethylene oxide, and AGE represents allyl glycidyl ether.

The results are also shown in Table VI.

TABLE VI

| Expt. No. | Reagent (mls.) | End Groups | | |
|---|---|---|---|---|
|  | EtOx | —SH | —NH | —OH |
| 1 | (—) | 1.0 | 1.0 | (—) |
| 2 | 3 | 0.3 | (—) | 2.1 |
| 3 | 10 | (—) | (—) | 2.0 |
|  | AGE |  |  |  |
| 4 | 15 | (—) | (—) | 2.1 |

(—) The particular group was not identified in the polymer.

EXAMPLE VII

This example illustrates the use of epichlorhydrin as the modifying agent.

10 gm. of poly(propylene-episulphide) were added to 50 ml. of water and 2 ml. of epichlorhydrin were added to the resulting mixture. The mixture was then agitated by tumbling end over end for 24 hours at room temperature. The polymer obtained after this time was removed by filtration, and dried, and the end groups were determined by infra-red spectroscopy.

The procedure was then repeated twice (Experiment Nos. 2 and 3) but using respectively 4 ml. and 6 ml. of epichlorhydrin instead of 2 ml. The results are shown in Table VII below:

TABLE VII

| Expt. No. | Epichlorhydrin (mls.) | End Groups | | |
|---|---|---|---|---|
|  |  | —SH | —NH | —OH |
| 1 | 2 | 1.0 | (—) | 0.8 |
| 2 | 4 | 0.2 | (—) | 1.5 |
| 3 | 6 | 0.2 | (—) | 2.1 |

(—) The particular group was not identified in the polymer.

Having now described our invention, what we claim is:

1. A process for the preparation of a poly(episulphide) which comprises contacting a reactant poly(episulphide) having one terminal thiol or hydroxyl group and another terminal hydroxyl or amino group in the molecule with a reagent selected from the class consisting of monoepisulphides, saturated aliphatic and cycloaliphatic aldehydes, hydrochloric acid, sulfuric acid, nitrous acid and nickel powder, and allowing the reactant poly(episulphide) to react with said reagent.

2. A process according to claim 1 in which the amount of said reagent is such that the molar ratio of the reagent to the reactant poly(episulphide) is from 1:1 to 10:1.

3. A process according to claim 2 in which said ratio is from 1:1 to 5:1.

4. A process according to claim 1, in which the reaction is carried out in the presence of an inert liquid reaction medium.

5. A process according to claim 4 in which said reaction medium is a solvent for said reactant poly(episulphide).

6. A process according to claim 4 in which said reactant poly(episulphide) is insoluble in said reaction medium.

7. A process according to claim 4, in which the amount of said reaction medium is from 0.5 ml. to 5 ml. per gramme of said reactant poly(episulphide).

8. A process according to claim 4 in which the reaction medium is a polar liquid.

9. A process according to claim 8 in which the reaction medium is water.

10. A process according to claim 1 in which the reaction is carried out at a temperature of from 0° C. to 100° C.

11. A process according to claim 10 in which the temperature is from 30° C. to 80° C.

12. A process according to claim 1 in which said reactant poly(episulphide) has a molecular weight of less than 10,000.

13. A process according to claim 12 in which the molecular weight of the reactants poly(episulphide) is from 750 to 3,500.

References Cited

UNITED STATES PATENTS

| | | | |
|---|---|---|---|
| 2,731,437 | 1/1956 | Bender et al. | 260—79.1 |
| 3,317,486 | 5/1967 | Berenbaum et al. | 260—79.1 |
| 3,317,919 | 5/1967 | Sander | 260—79 |
| 3,325,456 | 6/1967 | Adamek et al. | 260—79.7 |
| 2,676,165 | 4/1954 | Fettes | 260—79 |
| 3,322,851 | 5/1967 | Berenbaum | 260—79 |
| 3,331,816 | 7/1967 | Bertozzi | 260—79 |
| 3,342,770 | 9/1967 | Osborn et al. | 260—79 |

JAMES A. SEIDLECK, *Primary Examiner.*

M. T. MARQUIS, *Assistant Examiner.*

U.S. Cl. X.R.

260—2, 79, 609